Patented Nov. 5, 1940

2,220,200

UNITED STATES PATENT OFFICE 2,220,200

SEPARATION OF OIL FROM WAX

Fred E. Blachly, West Chester, Pa., assignor to The Sharples Corporation, a corporation of Delaware Application November 11, 1937, Serial No. 173,955

4 Claims. (Cl. 196—17)

The present invention relates to the dewaxing of petroleum stock and is concerned with the economical and efficient recovery, purification and reuse of solvents with which the stock is diluted in connection with the performance of dewaxing operations. It was conceived in connection with research in the performance of centrifugal dewaxing operations with the aid of heavy oil solvents which render the oil phase heavier than the wax to be removed and will be described with respect to such an operation.

Figure 1:
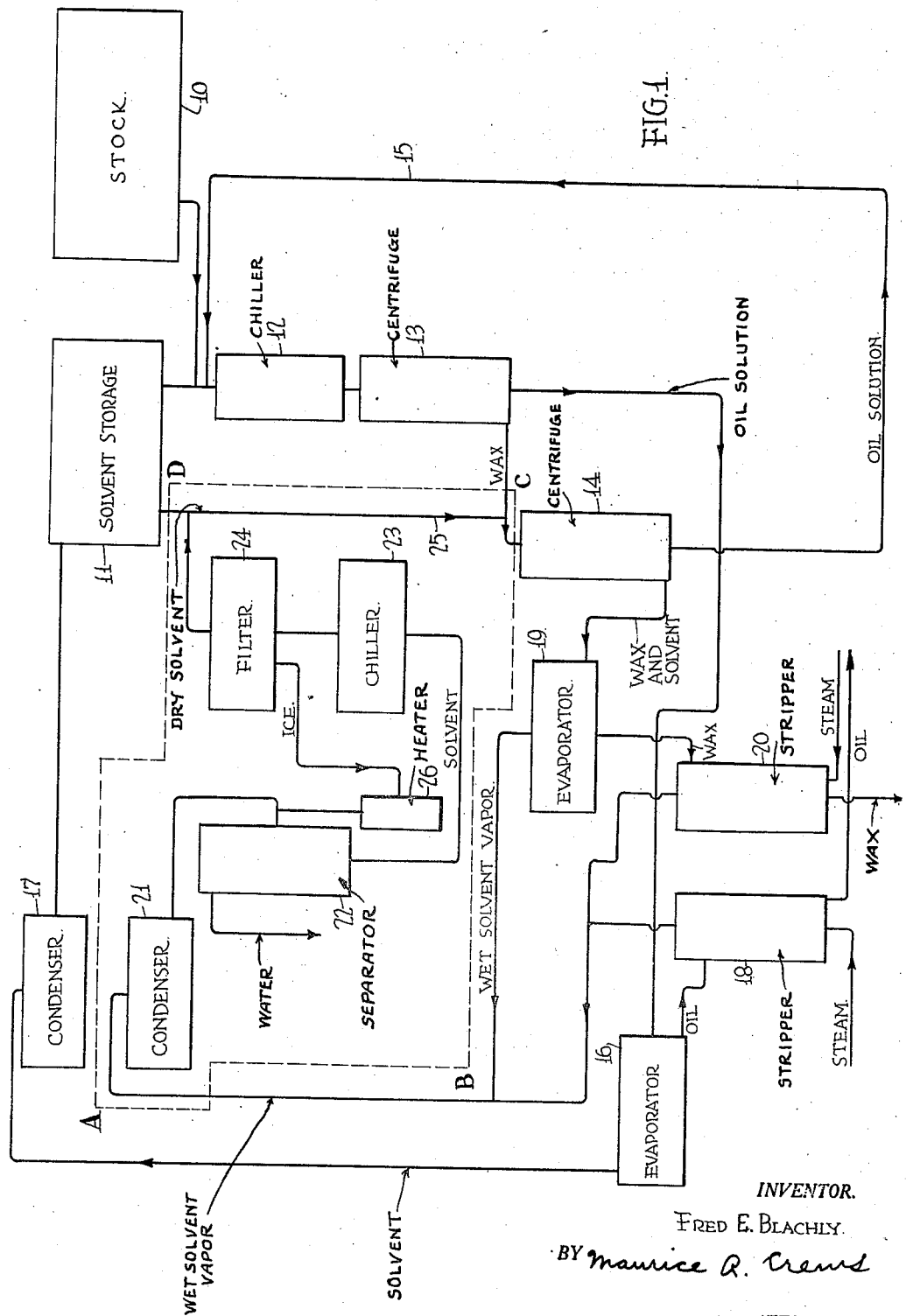
Figure 2:
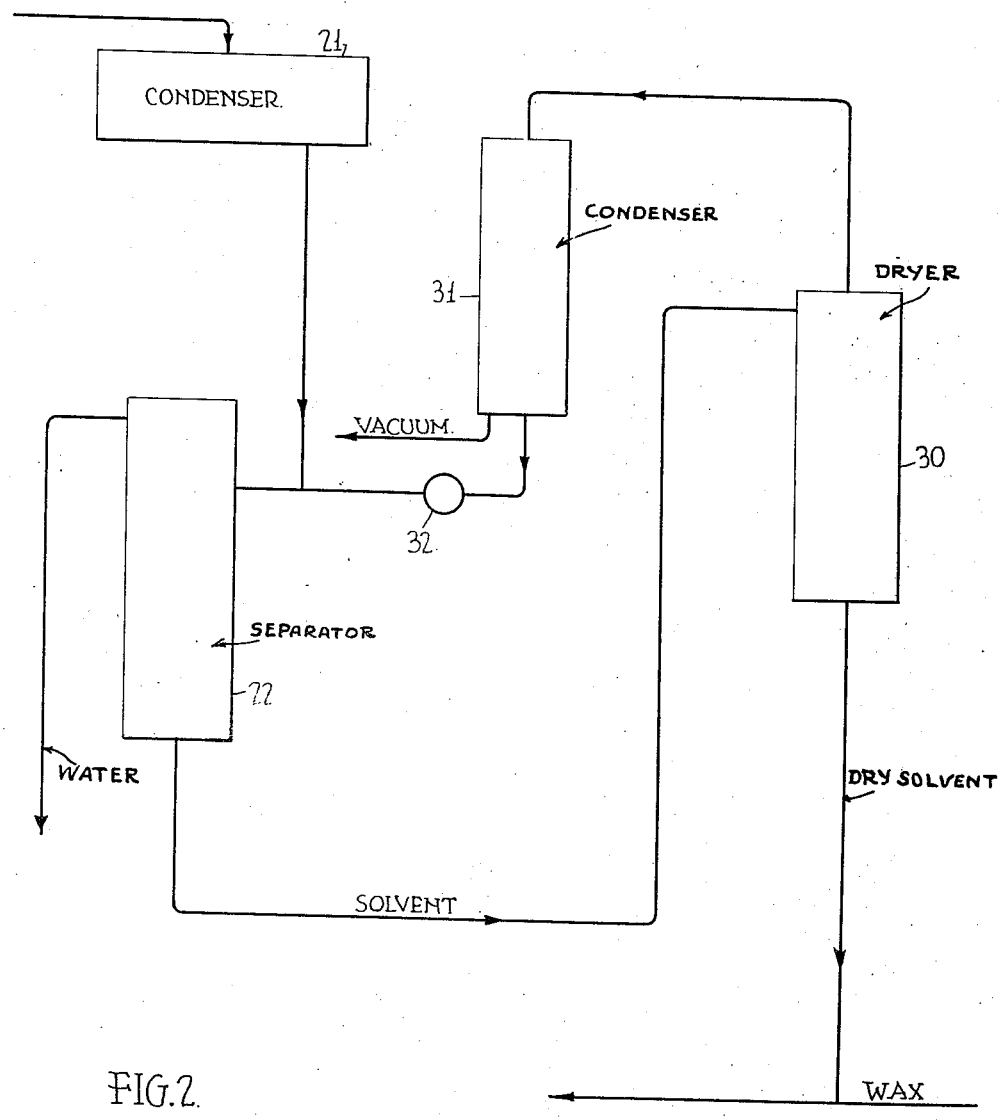

In the attached flow sheets:

Figure 1 illustrates the practice of one embodiment of the invention in connection with the use of heavy solvents and centrifuges and Figure 2 illustrates a modification in which an alternative procedure is substituted for the process illustrated within the dotted line diagram A, B, C, D of Figure 1.

Referring to the drawings by reference characters, the stock to be dewaxed is first passed from the storage tank 10 into confluence with solvent from a tank 11. The composition of the solvent will depend on the type of dewaxing operation to be performed and the nature of the stock under treatment. In the case of heavy solvent dewaxing by centrifugal separators, for example, the stock may be diluted with a solvent mixture comprising 65 parts of ethylene dichloride and 35 parts benzol in the ratio of 3.6 parts of solvent per part of oil.

The stock is mixed with the solvent at a temperature sufficiently high to effect solution of both oil and wax and is then passed through a chiller 12 designed to precipitate the wax from solution. From the chiller 12, the diluted stock containing precipitated wax as its discontinuous phase is passed through a centrifugal separator 13 which effects separation into two phases, a heavy oil solution containing the major portion of the solvent with which the stock was diluted, and a waxy effluent containing a small proportion of oil and a small part of the solvent. The oil contained in the waxy effluent from the centrifuge 13 is recovered by dilution with a substantial proportion of dry, chilled solvent and passage through the second centrifugal separator 14. An oil solution is discharged from the secondary centrifuge as its heavier phase and wax containing some solvent and a very small proportion of entrained oil is discharged as the lighter phase. The oil solution coming from the centrifuge 14 may be recycled to effect dilution of stock coming from the storage tank 10 as indicated by the line 15 which designates the conduit through which the oil solution is recycled.

The features of operation discussed above constitute no part of my present invention as they are described and claimed in the application of Leo D. Jones Serial No. 35,476, filed August 9, 1935, for Method of dewaxing mineral oils. The features of novelty of the present invention relate to the recovery of solvent from the oil and wax phases discharged respectively from the centrifuges 13 and 14 and to the efficient and economical dehydration of the solvent recovered in connection with such an operation. The oil effluent from centrifuge 13 is passed to an evaporator 16, which heats the oil solution indirectly and vaporizes the major portion of the solvent contained therein. This solvent passes overhead to a condenser 17 and is returned thence to the storage tank 11. Since the evaporator 16 does not effect as thorough a removal of solvent from the oil as may be desired, this oil is passed to a stripping column 18 provided at its base with an inlet for steam. The steam distillation effected in the column 18 removes residual solvent from the oil, but causes an undesired contamination of the solvent with water. The manner in which this moisture is removed from the solvent and from solvent separated from the wax constitutes the novel feature of the invention.

The wax effluent from the centrifuge 14 is passed to an evaporator 19. Since the wax is the lighter phase in each of the centrifuges 13 and 14, and since its specific gravity is closer to that of water than is the specific gravity of the oil solution, the water which may pass with the diluted stock to the centrifuges 13 and 14 will be discharged with wax, leaving the oil solution relatively free of water. It is desirable that this water be removed from the solvent removed from the wax, before reuse of such solvent, for the presence of a substantial proportion of water in the centrifuging operations has a deleterious effect on those operations. The solvent vapor passing overhead from the evaporator 19 must accordingly be subjected to a dehydrating operation before it is reused.

The non-volatilized effluent from the evaporator 19 constitutes wax contaminated with a very small proportion of solvent. This wax is passed to a stripping column 20 which is provided with a steam inlet at its base and the steam stripping operation performed in the column effects removal of residual solvent.

From the above discussion, it will be evident that the solvent recovery operations so far described result in three separate sources of solvent contaminated with undesired water, these solvent fractions being the overhead fractions from the evaporator 19 and from the columns 18 and 20 respectively. These three fractions are passed through a condenser 21 in which both the solvent and water vapor are condensed. The effluent from the condenser 21 is passed to a suitable water separator 22. In the form of water separator indicated, separation is effected by gravity and the water is discharged as the lighter effluent and the recovered solvent as the heavier effluent. It will be understood, of course, that this situation will be reversed in case of the use of a dewaxing process in which the solvent is of a lower specific gravity than the oil; e. g., in the case of a naphtha dewaxing process.

The solvent recovered from water separator 22 is still not sufficiently dehydrated for reuse in the process and must be subjected to a further dehydrating operation. The fundamental feature of the present invention consists in the performance of this operation by a process involving chilling of the solvent incident to its dehydration. In cases in which the dried solvent is reused in the dilution of wax passing from the centrifuge 13 to the centrifuge 14 as illustrated, this incidental chilling has an important advantage in economy, for the solvent with which such wax is diluted should be at relatively low temperature, and the attainment of such a low temperature as an incident to the dehydration of the solvent avoids the necessity of a separate chilling step.

In the form of the invention illustrated in Fig. 1, solvent from separator 22 is passed through a chiller 23 adapted to reduce its temperature to a point below the freezing point of water. Water contained in the solvent passing through the chiller 23 is in very finely divided form in the solvent, the reason for this fact being that larger drops of water can be readily separated in the separator 22 and that only the very finely divided drops and dissolved water resist separation to such an extent that they pass with the solvent to the chiller 23. In view of the finely divided form of the water passing through the chiller, this water freezes in the chiller in the form of very fine crystals which can be readily separated from the solvent, for example by filtration through filter 24 as illustrated. It is to be noted that other forms of separator might be substituted for filter 24. A gravity separator or a centrifugal separator might, for example, be employed in removing the fine particles of ice from the solvent effluent from the chiller 23. Chilled and dried solvent from the filter 24 is recycled through conduit 25 into confluence with the waxy effluent from the centrifuge 13. It will be evident that, by the technique described above, the separation of residual moisture from the solvent and the chilling of that solvent for reuse are effected in a single series of simple and economical operations of chilling and filtration. Ice removed from the solvent in the filter 24 contains a small proportion of solvent, and this solvent may be removed by the return of the ice through a heater 26 to the water separator 22.

In the form of the invention illustrated in Fig. 2, an alternative process of simultaneously chilling and dehydrating the solvent is substituted for the process steps illustrated within the dotted line diagram A, B, C, D of Fig. 1. In this form of the invention, the solvent condensed in the condenser 21 and partially freed of water in the separator 22 is passed to a vacuum drying apparatus 30. In this drying apparatus partial vaporization is effected by reduction of pressure and the moisture, together with a small proportion of the solvent, is removed overhead and passed to the condenser 31. This condensed overhead fraction is then recycled by means of a pump 32 to the water separator 22. The evaporation of a part of the liquid passed to the dryer 30 causes the incidental effect of chilling the portion of the liquid not evaporated, and hence effects a chilling of the non-volatilized portion to a low temperature. Such chilled solvent is then used in the dilution of the wax from the centrifuge 13.

In the case of dehydration of a mixture of solvents such as that discussed above, the wet solvent from the bottom of the water solvent separator 22 may be delivered to the solvent dryer 30 at a temperature 90° F. and drawn off from the bottom of the solvent dryer at 40° F. The vacuum may be maintained at 29" of mercury and effect volatilization of 20% of the solvent together with all of the water contained in the solvent passing to the dryer 30. The volatilization of this portion of the solvent in the dryer 30 effects the incidental chilling of the remainder to approximately 40° F.

In connection with this embodiment of the invention, the condenser 31 may be economically cooled recuperatively by passing the chilled oil effluent from the centrifuge 13 through coils forming a part of the condenser apparatus.

While the embodiments of the invention illustrated in Figs. 1 and 2 are substantially different in detail, each of these embodiments attains the fundamental purpose of the invention, to wit, the chilling of solvent prior to reuse in such a manner as to effect the incidental removal of the undesired moisture in connection with the chilling operation. Modifications will be obvious to those skilled in the art and I do not wish to be limited except by the scope of the subjoined claims.

I claim:

1. The method of removing entrained oil from wax which comprises diluting said wax with a solvent at a temperature at which said oil is soluble in the solvent but at which the wax is not appreciably soluble, separating wax together with some solvent and water entrained in the solvent from the oil solution, separating the mixture of solvent and water from the wax, removing water entrained in said solvent by vacuum evaporation and thereby chilling said solvent simultaneously with the evaporating operation, and finally diluting with said chilled solvent further wax to be de-oiled.

2. The method of removing entrained oil from wax which comprises diluting said wax with a solvent at a temperature at which said oil is soluble in the solvent but at which the wax is not appreciably soluble, separating wax together with some solvent and water entrained in the solvent from the oil solution, separating the mixture of solvent and water from the wax, removing water entrained in said solvent, together with a part of the solvent by vacuum evaporation and thereby chilling said solvent simultaneously with the evaporating operation, and finally diluting with said chilled solvent further wax to be de-oiled.

3. In the art of separating oil and wax from each other by means of a solvent adapted to dissolve the oil and precipitate the wax at a low temperature, the steps comprising separating water from a mixture of solvent and water, said solvent to be used in said separation of wax and oil from each other, said separation of water being accomplished by a process involving the chilling of the solvent containing water simultaneously with the separation of said water, by vacuum evaporation of water from said mixture of water and solvent, and thereafter diluting with said chilled solvent material to be subjected to the process of separating oil and wax from each other.

4. In the art of separating oil and wax from each other by means of a solvent adapted to dissolve the oil and precipitate the wax at a low temperature, the steps comprising separating water from a mixture of solvent and water by vacuum evaporation, and thereby chilling said solvent by extraction of heat of vaporization of said water from said solvent in said step of vacuum evaporation, thereafter diluting with said chilled solvent a mixture of oil and wax to be subjected to the process of separating oil and wax from each other, and separating said wax from said oil dissolved in said solvent, while the stock diluted with the solvent is at a temperature sufficiently low to keep the wax out of solution but maintain the oil in solution in the solvent.

FRED E. BLACHLY.